(12) United States Patent
Lutter et al.

(10) Patent No.: US 6,771,208 B2
(45) Date of Patent: Aug. 3, 2004

(54) MULTI-SENSOR SYSTEM

(75) Inventors: Robert Pierce Lutter, Tacoma, WA (US); Tracey Olson, Auburn, WA (US)

(73) Assignee: Medius, Inc., Seattle, WA (US)

(*) Notice: Subject to any disclaimer, the term of this patent is extended or adjusted under 35 U.S.C. 154(b) by 0 days.

(21) Appl. No.: 10/132,885

(22) Filed: Apr. 24, 2002

(65) Prior Publication Data

US 2003/0201929 A1 Oct. 30, 2003

(51) Int. Cl.[7] .............................................. G01S 13/93
(52) U.S. Cl. .......................... 342/52; 342/53; 342/54; 342/70
(58) Field of Search ........................... 342/25, 29, 36, 342/41, 59, 66, 70–72, 104, 106, 108, 118, 147

(56) References Cited

U.S. PATENT DOCUMENTS

| | | | | |
|---|---|---|---|---|
| 5,008,678 A | * | 4/1991 | Herman ...................... | 342/158 |
| 5,045,937 A | * | 9/1991 | Myrick ....................... | 348/144 |
| 5,115,245 A | * | 5/1992 | Wen et al. .................. | 342/175 |
| 5,339,086 A | * | 8/1994 | DeLuca et al. ............. | 342/371 |
| 5,532,706 A | * | 7/1996 | Reinhardt et al. .......... | 343/778 |
| 5,585,798 A | * | 12/1996 | Yoshioka et al. ............ | 342/70 |
| 5,617,085 A | * | 4/1997 | Tsutsumi et al. ........... | 340/903 |
| 6,203,366 B1 | * | 3/2001 | Muller et al. ............... | 439/561 |
| 6,204,804 B1 | * | 3/2001 | Andersson .................. | 342/113 |
| 6,243,450 B1 | | 6/2001 | Jansen et al. ............... | 379/144 |
| 6,297,732 B2 | * | 10/2001 | Hsu et al. ................... | 340/439 |
| 2003/0004633 A1 | * | 1/2003 | Russell et al. ............... | 701/96 |
| 2003/0011509 A1 | * | 1/2003 | Honda ......................... | 342/70 |

FOREIGN PATENT DOCUMENTS

| | | |
|---|---|---|
| WO | WO96/24229 | 8/1996 |
| WO | WO99/08436 | 2/1999 |
| WO | WO99/57662 | 11/1999 |
| WO | WO99/65183 | 12/1999 |
| WO | WO01/30061 | 4/2001 |
| WO | WO01/58110 | 8/2001 |

OTHER PUBLICATIONS

Product description of Raytheon RT Secure, "Embedded Hard Real–Time Secure Operating System", Copyright 2000, pp. 1–2.
Product description of Raytheon RT Secure, Copyright 2001, pp. 1–2.
Product description of Raytheon RT Secure, "Development Environment", Copyright 2001, pp. 1–2.
Product description of Raytheon Electronic Systems (ES), Copyright 2002, pp. 1–2.

(List continued on next page.)

*Primary Examiner*—Thomas H. Tarcza
*Assistant Examiner*—Isam Alsomiri
(74) *Attorney, Agent, or Firm*—Marger Johnson & McCollom, PC

(57) ABSTRACT

A multi-sensor system includes multiple sensors that are integrated onto the same substrate forming a unitary multi-sensor platform that provides a known consistent physical relationship between the multiple sensors. A processor can also be integrated onto the substrate so that data from the multiple sensors can be processed locally by the multi-sensor system.

18 Claims, 3 Drawing Sheets

OTHER PUBLICATIONS

H. Chung, L. Ojeda, and J. Borenstein, "Sensor Fusion for Mobile Robot Dead–reckoning with a Precision–calibrated Fiber Optic Gyroscope", 2001 IEEE International Conference on Robotics and Automation, Seoul, Korea, May 21–26, pp. 1–6.

A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1–13.

J. Takezaki, N. Ueki, T. Minows, H. Kondoh, "Support System for Safe Driving—A Step Toward ITS Autonomous Driving—", Hitachi Review, vol. 49, No. 3, 2000, pp. 1–8.

S.G. Goodridge, "Multimedia Sensor Fusion for Intelligent Camera Control and Human–Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1–5.

M. Chantler, G. Russel, and R. Dunbar, "Probabilistic Sensor Fusion for Reliable Workspace Sensing", pp. 1–14.

ISIS Project: Sensor Fusion, Linkoping University Division of Automatic Control and Communication Systems in cooperation with SAAB (Dynamics and Aircraft), 18 pages.

Hitachi Automated Highway System (AHS), Automotive Products, Hitachi, Ltd., Copyright 1994–2002, 8 pages.

Vehicle Dynamics Lab, University of California, Berkeley, funded by BMW, current members: D. Caveney and B. Feldman, "Adaptive Cruise Control", 17 pages.

Counterair: The Cutting Edge, Ch. 2 "The Evolutionary Trajectory The Fighter Pilot–Here to Stay?" AF2025 v3c8–2, Dec. 1996, pp. 1–7.

Counterair: The Cutting Edge, Ch. 4 "The Virtual Trajectory Air Superiority without an "Air" Force?" AF2025 v3c8–4, Dec. 1996, pp. 1–12.

TNO FEL Annual Review 1998: Quality works, 16 pages.

Boeing News Release, "Boeing Demonstrates JSF Avionics Multi–Sensor Fusion", Seattle, WA, May 9, 2000, pp. 1–2.

Boeing Statement, "Chairman and CEO Phil Condit on the JSF Decision", Washington, D.C., Oct. 26, 2001, pp. 1–2.

Ada 95 Transition Support—Lessons Learned, Sections 3, 4, and 5, CACI, Inc. –Federal, Nov. 15, 1996, 14 pages.

Joint Strike Fighter Terrain Database, ets–news.com "Simulator Solutions"2002, 3 pages.

MSRC Redacted Proposal, 3.0 Architecture Development, pp. 1–43.

Powerpoint Presentation by Robert Allen—Boeing Phantom Works entitled "Real–Time Embedded Avionics System Security and COTS Operating Systems", Open Group Real–time Forum, Jul. 18, 2001, 16 pages.

Green Hills Software, Inc., "The AdaMULTI 2000 Integrated Development Environment", Copyright 2002, 7 pages.

Luttge, Karsten; "E–Charging API: Outsource Charging to a Payment Service Provider"; IEEE; 2001 (pp. 216–222).

* cited by examiner

MULTI-SENSOR SYSTEM

BACKGROUND OF THE INVENTION

Different sensors can be used in vehicles to identify objects and possible collision conditions. For example, there may be an optical sensor, such as a camera, mounted to the roof of the vehicle. Another Infrared (IR) sensor may be mounted in the front grill of the vehicle. A third inertial sensor may be located in yet another location in the central portion of the vehicle. Data from these different sensors is correlated together to identify and track objects that may come within a certain vicinity of the vehicle.

The measurements from the different sensors must be translated to a common reference point before the different data can be accurately correlated. This translation is difficult because the sensors are positioned in different locations on the vehicle. For example, the sensor located inside the front bumper of the vehicle may move in one direction during a collision while the sensor located on the top of the vehicle roof may move in a different direction.

One of the sensors may also experience vibrations at a different time than the other sensor. For example, the front bumper sensor may experience a vertical or horizontal movement when the vehicle runs over an obstacle before any movements or vibrations are experienced by the roof sensor. This different movements of sensors relative to each other make is very difficult to accurately determine the precise position and orientation of the sensors when the sensor readings are taken. This makes it difficult to translate the data into common reference coordinates.

The present invention addresses this and other problems associated with the prior art.

SUMMARY OF THE INVENTION

A multi-sensor system includes multiple sensors that are integrated onto the same substrate forming a unitary multi-sensor platform that provides a known consistent physical relationship between the multiple sensors. A processor can also be integrated onto the substrate so that data from the multiple sensors can be processed locally by the multi-sensor system.

The foregoing and other objects, features and advantages of the invention will become more readily apparent from the following detailed description of a preferred embodiment of the invention which proceeds with reference to the accompanying drawings.

DETAILED DESCRIPTION

Figure 1:
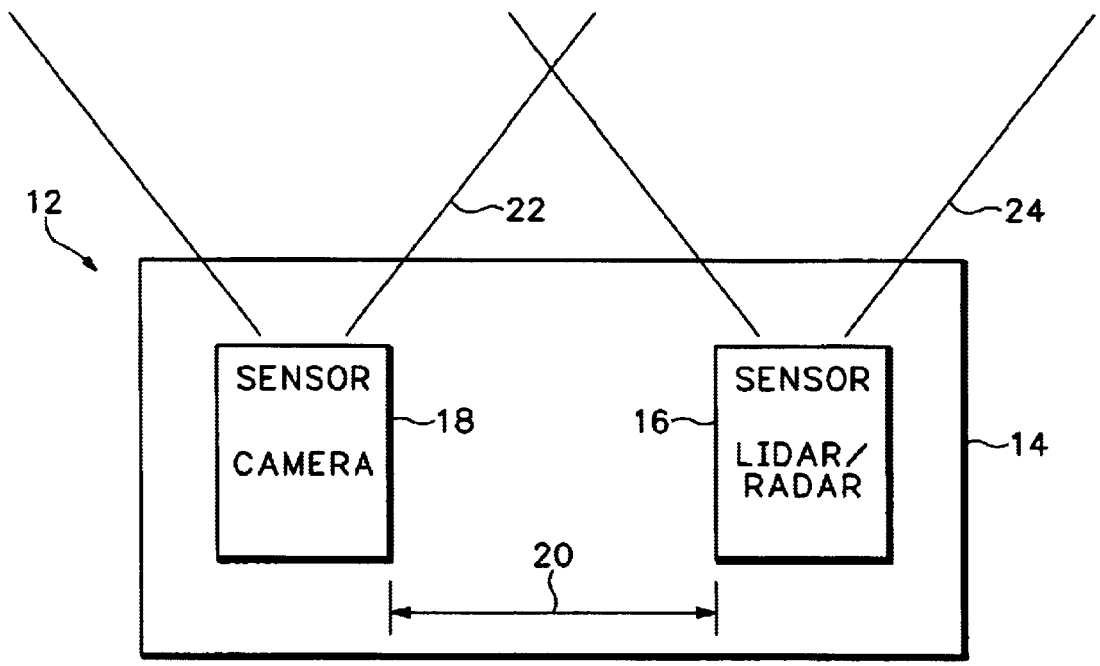
FIG. 1 is a block diagram of a multi-sensor system.

FIG. 1 shows a multi-sensor system 12 that includes different sensors 16 and 18 that are both integrally attached to or integrally formed into the substrate 14. Because the two sensors 16 and 18 are integrated onto the same substrate 14, any forces experienced by sensor 16 are also experienced by sensor 18. One type of material that is used for substrate 14 is invar. Invar is a rigid metal that has been cured with respect to temperature so that its dimensions do not change with fluxuations in temperature. Any rigid material that is resilient to expansion or contraction with temperature changes can be used.

Locating the sensors 16 and 18 on the same substrate 14 simplifies the cost of sensor manufacturing and installation. For example, the two sensors 16 can be assembled onto the substrate 14 in a factory prior to being installed on a vehicle. If the two sensors 16 and 18 were not mounted on the same substrate 14, then each sensor would have to be separately mounted on the vehicle and then calibrated to a known alignment with respect to each other. Even if the two sensors were installed correctly, changes in the shape of the vehicle due to wear, temperature, etc. over time could change the initial alignment between the two sensors.

Premounting or prefabricating the sensors 16 and 18 on the substrate 14 prior to installation on a vehicle, prevents these alignment errors. Only the substrate 14 of the multi-sensor system 12 has to be mounted to the vehicle, not the individual sensors 16 and 18. This allows the relative position 20 and alignment between the two sensors 16 and 18 to remain the same regardless of how the substrate 14 is mounted on the vehicle. Wiring is also simplified since only one wiring harness has to be run through the vehicle to the multi-sensor system 12.

In one example, the sensor 16 senses an area 24 and the sensor 18 senses an area 22 that are both coincident. One of the sensors may have a wider field of view than the other sensor. There can also be more than two sensors on substrate 14 and any active or passive sensor that provides object detection or vehicle force measurements can be mounted onto substrate 14. Some examples of sensors include ultrasonic, Infra-Red (IR), video, radar, and lidar sensors.

Depending on the substrate 14 and the types of sensors, different mounting techniques can be used. The sensors may be separate components that are glued or bolted onto the substrate 14. If the multi-sensor system 12 is an integrated circuit, then the sensors 16 and 18 may be integrally fabricated onto a silicon or alternative temperature resilient substrate 14 using known deposition processes.

In one example, sensor 14 is a radar or lidar sensor and sensor 18 is a camera. Combining a video camera sensor with a radar and/or lidar sensor on the substrate 14 provides several advantages. The camera sensor 18 provides good angle resolution and object identification. The radar or lidar sensor 16 on the other hand is very effective in identifying range information.

Combining the camera video sensor 18 with the radar or lidar sensor 16 on the same substrate 14 allows more effective correlation of camera angle and identification data with radar or lidar range information. For example, the radar sensor 14 may only be able to measure angle of an object to within one-half a degree. Because of the limited angle accuracy of the radar angle readings, it may not be possible to determine from the radar reading along if an oncoming vehicle is coming from the same lane of traffic or from an opposite lane of traffic.

The video sensor 18 may be able to accurately determine the angle of an object to within one-tenth or one-one hundredth of a degree. By correlating the radar information with the camera information, the location of an on-coming vehicle can be determined more accurately.

Do to vibration differences and possible inaccuracies in sensor alignment, it may not be possible, within fractional degrees of accuracy, to correlate information with separately mounted sensors. In other words, if the camera angle varies within plus or minus one degree with respect to the radar angle, then the camera data may not be able to refine the radar measurements.

By mounting the camera sensor 18 and the radar sensor 16 to the same substrate 14, the relative position and alignment between the two sensors remains essentially the same regardless of physical effects on the vehicle. Thus, the camera data can be correlated with radar data to within fractions of a degree of accuracy.

In another example, a first sensor may detect one object out in front of the vehicle. A second sensor located somewhere else on the vehicle may detect two different objects in front of the vehicle. Because of vibrations in different parts of the vehicle, a central processor may not be able to determine which of the two objects detected by the second sensor is associated with the object detected by the first sensor. With the multi-sensor system 12, measurement errors caused by this vehicle vibration is cancelled since the two sensors 16 and 18 effectively experience the same amount of vibration at the same time.

Figure 2:
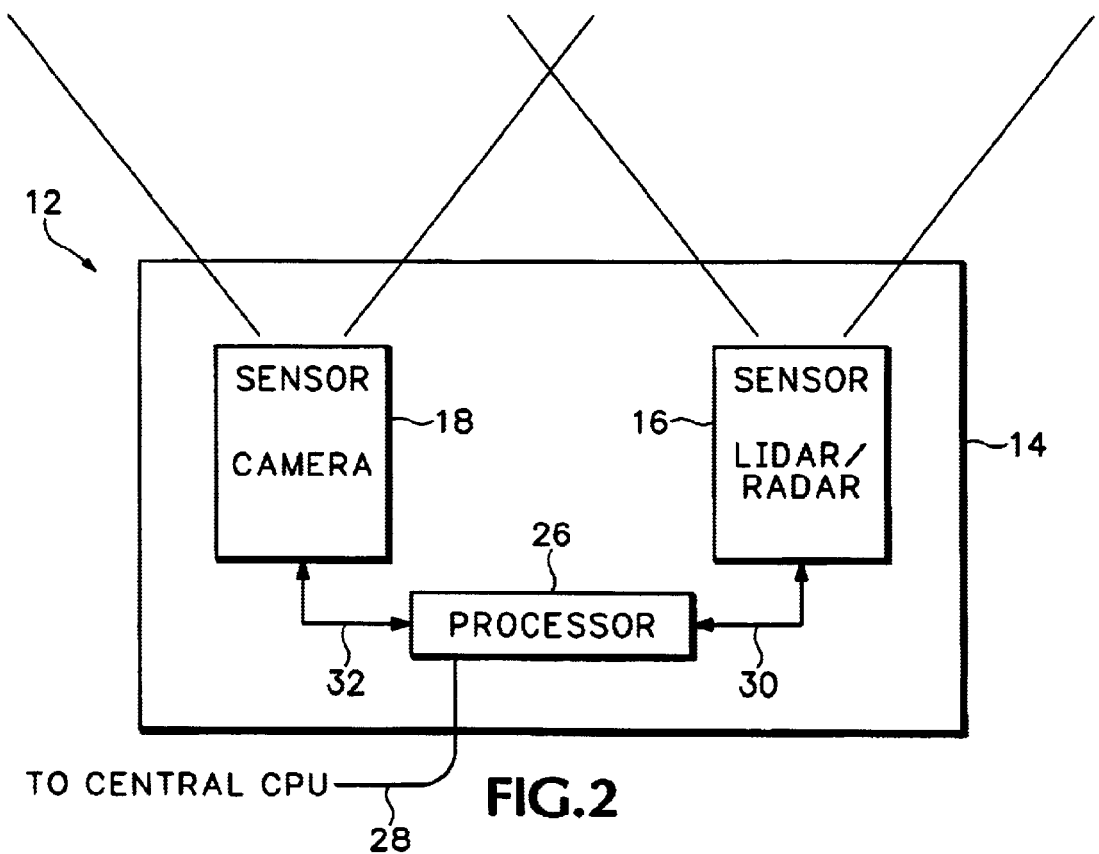
FIG. 2 is a block diagram of an alternate embodiment of the multi-sensor system that includes an on-board processor.

FIG. 2 shows an alternative embodiment where a processor 26 is mounted to the substrate 14. Again the processor 26 can be a standalone component that is rigidly attached to substrate 14. Alternatively, the processor 26 is a portion of the same integrated circuit that also contains the circuitry for sensors 16 and 18. The processor 26 can perform signal processing tasks for both sensor 18 and sensor 16 and can also handle communication and diagnostics tasks. Tracks for identified objects are sent over connection 28 to other multi-sensor systems in the vehicle or to a vehicle control system as shown later in FIG. 5.

In previous multi-sensor applications, each sensor was required to send all data back to the same central processing system. This takes additional time and circuitry to send all of the data over a bus. By mounting the processor 26 in the multi-sensor system 12, data from both sensor 16 and sensor 18 can be processed locally requiring fewer reports to be sent over connection 28.

Figure 3:
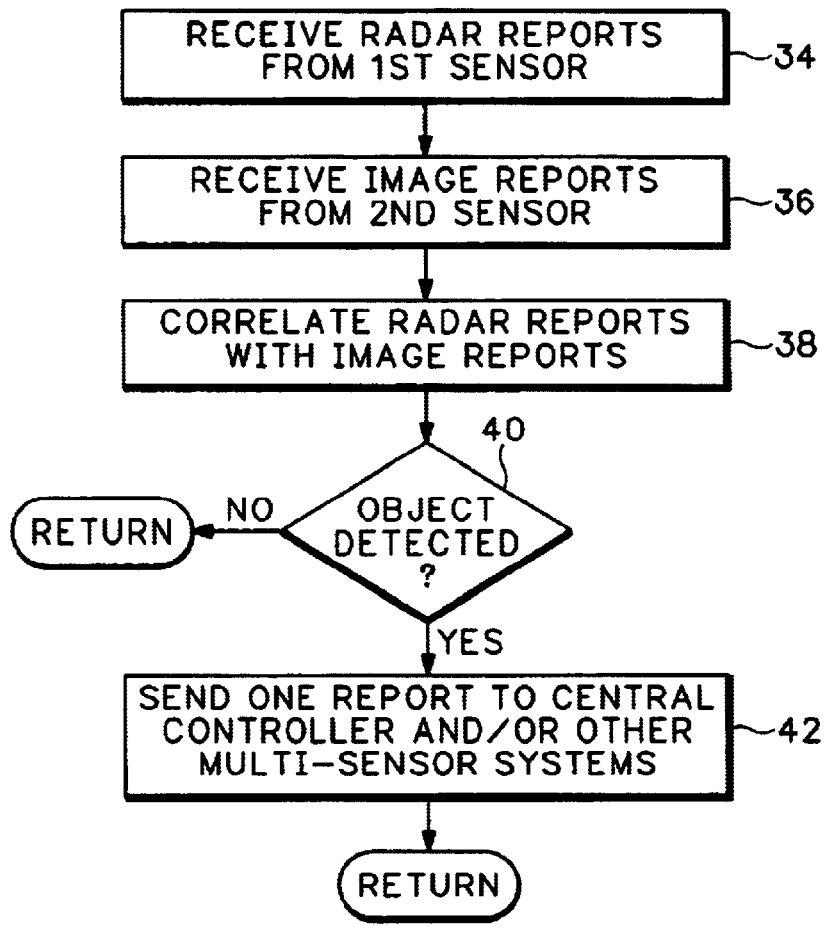
FIG. 3 is a flow diagram showing how the processor in FIG. 2 operates.

Referring to FIG. 3, the processor 26 in FIG. 2 receives radar reports from the first sensor 16 in block 34. The processor 26 receives image reports from the second sensor 18 in block 36. The processor 26 correlates the different reports in block 38. Since the relative position of the two sensors 16 and 18 are the same and possibly coincident, the processor 26 does not have to perform as many calculations transforming sensor measurements into common body coordinates for the vehicle.

The correlation may include first determining if the reports actually identify an object in block 40. The processor 26 can verify or refine object detection information from one of the sensors with the message reports received from the other sensor. If both sensors do not verify detection of the same object within some degree of certainty, then the processor system 26 may discard the message reports or continue to analyze additional reports in block 40.

When an object is detected in block 40, the processor 26 only has to send one report in block 42 representing the information obtained from both sensor 16 and sensor 18. This reduces the total amount of data that has to be sent either to a central controller or another multi-sensor system in block 42.

Figure 4:
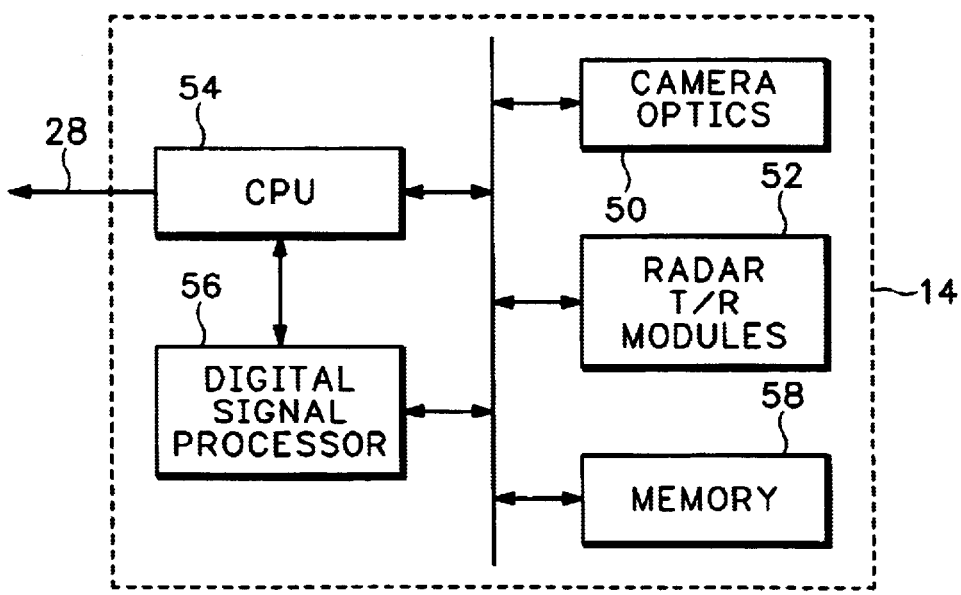
FIG. 4 is detailed diagram showing how different elements in the multi-sensor system are electrically connected together.

FIG. 4 shows in further detail the different devices that may be integrated on the multi-sensor substrate 14. Camera optics 50 and radar transmit/receive modules 52 are each connected to a Central Processing Unit (CPU) 54 and a digital signal processor 56. A memory 58 is used to store sensor data, signal processing applications and other operating system functions. The CPU 54 is also used for conducting distributed sensor fusion as described in further detail below.

Distributed Sensor Fusion

Figure 5:
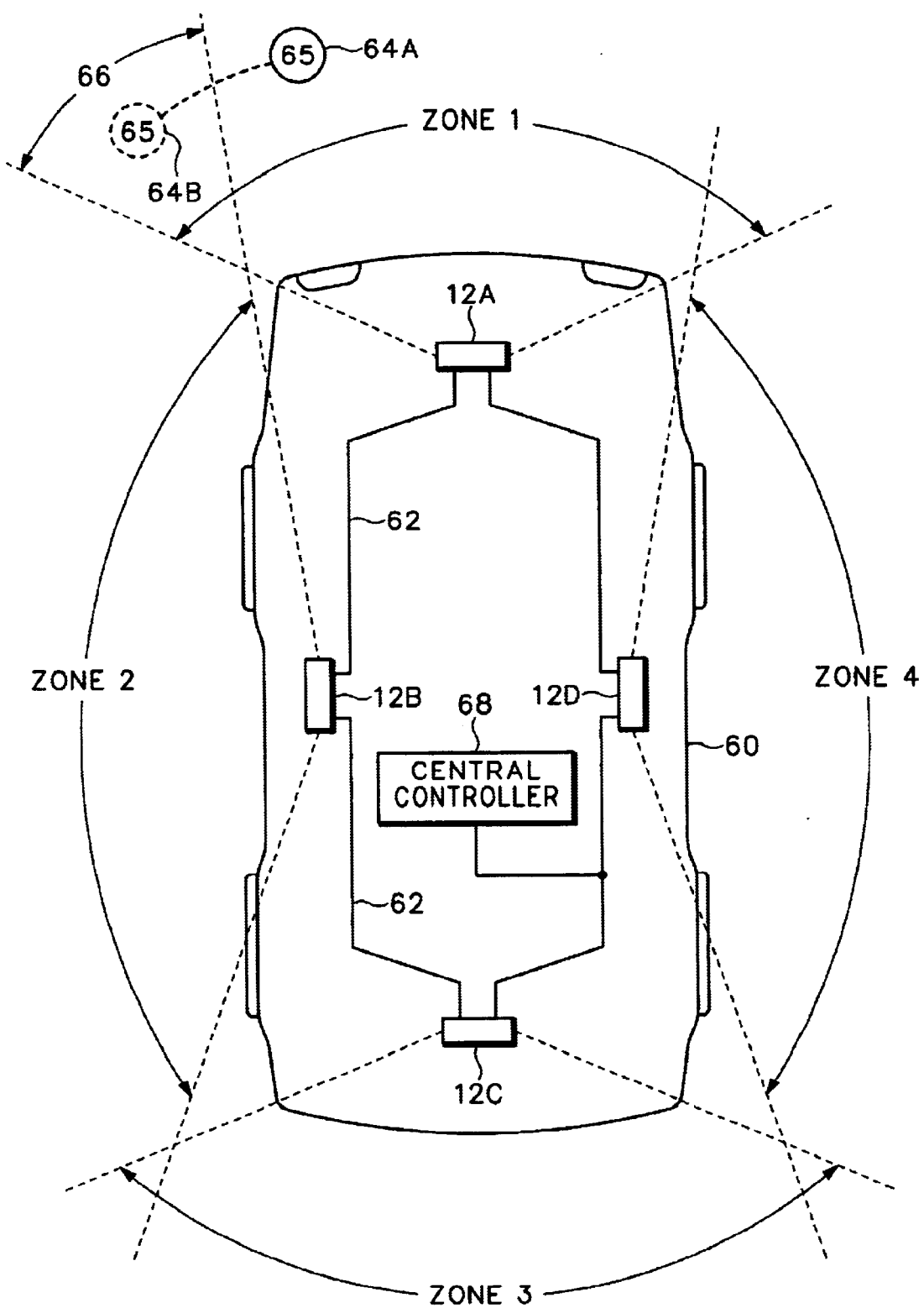
FIG. 5 is a diagram showing how different multi-sensor systems operate together to track objects.

Referring to FIG. 5, different multi-sensor systems 12A–12D are used for monitoring different zones around a vehicle 60. For example, system 12A monitors zone 1, system 12B monitors zone 2, system 12C monitors zone 3 and system 12D monitors zone 4. The CPU 54 and digital signal processor 56 (FIG. 4) in each multi-sensor system 12A–12D in combination with the camera and radar sensors identify and track objects autonomously, without having to communicate with a central controller 68 in vehicle 60.

Whenever an object is detected, identified and tracked, a track file is created for that object in memory 58 (FIG. 4). If the object moves to another zone around the vehicle 60, the multi-sensor system for the zone where the object was previously detected only has to send the track files to the other multi-sensor system associated with the overlapping region.

For example, a bicycle 65 may be initially detected by multi-sensor system 12A at location 64A in zone 1. The multi-sensor system 12A creates a track file containing position, speed, acceleration, range, angle, heading, etc. for the bike 65.

As the vehicle 60 moves, or the bike 65 moves, or both, the bike 65 may move into a new position 64B in an overlapping region 66 between zone 1 and zone 2. The multi-sensor system 12A upon detecting the bike 65 in the overlapping region 66 sends the latest track file for the bike 65 to multi-sensor system 12B over bus 62. This allows the multi-sensor system 12B to start actively tracking bike 65 using the track information received from multi-sensor system 12A.

The multi-sensor system 12A only has to send a few of the latest track files for the common area 66 over connection 64 to multi-sensor 12B in order for system 12B to maintain a track on bike 65. The track files can be exchanged between any of the multi-sensor systems 12A–12D. When there are two multi-sensor systems that have overlapping tracks for the same object, the track file with the greatest confidence of accuracy is used for vehicle warning, security, and control operations. There are known algorithms that calculate track files and calculate a degree of confidence in the track file calculations. Therefore, describing these algorithms will not be discussed in further detail.

There may be vibrational effects on the different multi-sensor systems 12A–12D. This however does not effect the track calculations generated by the individual multi-sensor systems 12A–12D. The only compensation for any vibration may be when the track files are translated into body coordinates when a possible control decision is made by the central controller 68.

The connection 62 can a CAN bus, wireless 802.11 link or any other type of wired or wireless link. The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A multi-sensor system, comprising:
   multiple sensors used in multi-sensor units for detecting objects or impact conditions around a vehicle; and
   substrates providing common mounting bases for the multiple sensor units; and
   processors mounted to the substrates and electrically coupled to the multiple sensors in the multi-sensor units wherein the processors transfer the track files to another multi-sensor unit that has an adjacent sensed region when detected objects move into the adjacent sensed region for the other multi-sensor unit.

2. A multi-sensor system according to claim 1 wherein the substrates are made from a material resistant to dimensional changes due to temperature.

3. A multi-sensor system according to claim 1 wherein the substrates are is made from invar or a steel material.

4. A multi-sensor system according to claim 1 wherein the multiple sensors are rigidly mounted to the substrates prior to the substrate being installed in the vehicle.

5. A multi-sensor system according to claim 1 wherein the processors correlate data from the multiple sensors and converts the correlated data for detected objects into track files.

6. A multi-sensor system according to claim 5 including a CAN bus or a wireless connection coupled between the multi-sensor units to transfer the track files to another multi-sensor unit that has an adjacent sensed region when detected objects move into the adjacent sensed region.

7. A multi-sensor system according to claim 1 wherein a first one of the sensors in the multi-sensor units is a video camera and a second one of the sensors in the multi-sensor units is a radar or lidar module.

8. A multi-sensor system according to claim 1 wherein the multiple sensors in the multi-sensor units have coincident scan paths so that correlation of measurements for the multiple sensors do not have to be transformed into common coordinates.

9. A method for sensing events on a vehicle, comprising:
   installing a first sensor on a platform;
   installing a second sensor on the same platform;
   installing the platform on the vehicle;
   locating a processor on the platform and using the processor to generate track files from the first sensor and the second sensor;
   exchanging the track files with other platforms on the vehicle that contain multiple sensors, each platform generating its own track files for objects detected around the vehicle.

10. A method according to claim 9 including correlating data from the first sensor and second sensor to identify and track objects around the vehicle.

11. A method according to claim 10 including locating a processor on the platform and using the processor to correlate the track files from the first sensor and the second sensor.

12. A method according to claim 11 including using the processor to generate track files that include position, speed, acceleration, range, angle, and heading of the identified objects.

13. A method according to claim 12 including notifying a central controller when the track files identify an object within a selected range of the vehicle.

14. A method according to claim 9 wherein the platform is a substrate and including integrally fabricating the first and second sensor onto the substrate so that the first and second sensors and the substrate coexist in a same integrated circuit.

15. A multi sensor system comprising:
   plural multi sensor units, each multi sensor unit including;
      multiple sensors for detecting objects or impact conditions around a vehicle;
      a processor for processing data generated by the integrated sensors into track files; and
      a wireless or wired communication link between the multi sensor units with overlapping or non-overlapping fields of view for sharing information in the track files.

16. A multi sensor system according to claim 15 wherein the communications link is wireless 802.11.

17. A multi sensor system according to wherein the communications link is a wired connection the automotive CAN bus.

18. A multi sensor system according to claim 15 wherein the processor exchanges the track files with other multi-sensor systems that have adjacent sensed regions when objects or targets move into the adjacent sensed regions.

* * * * *